Sept. 8, 1936.　　　　W. H. McGILL　　　　2,053,776
SIGNAL DEVICE
Filed July 14, 1931
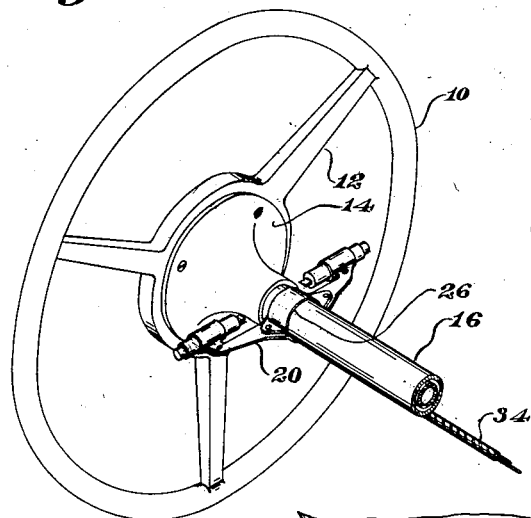
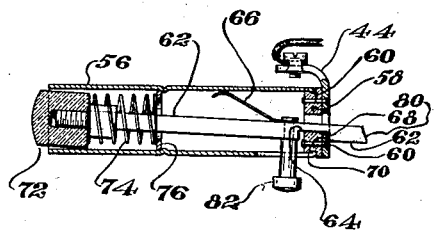
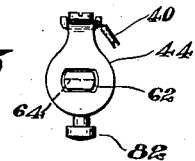
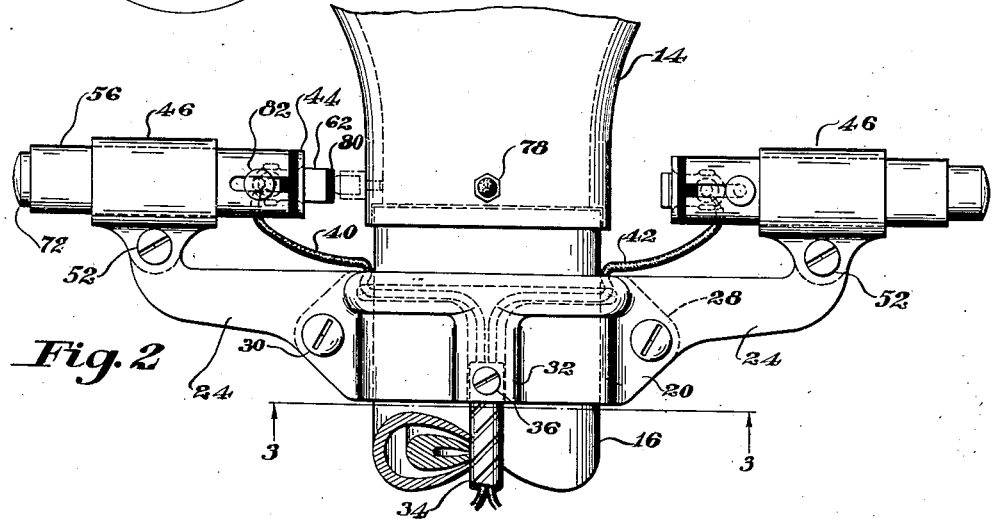
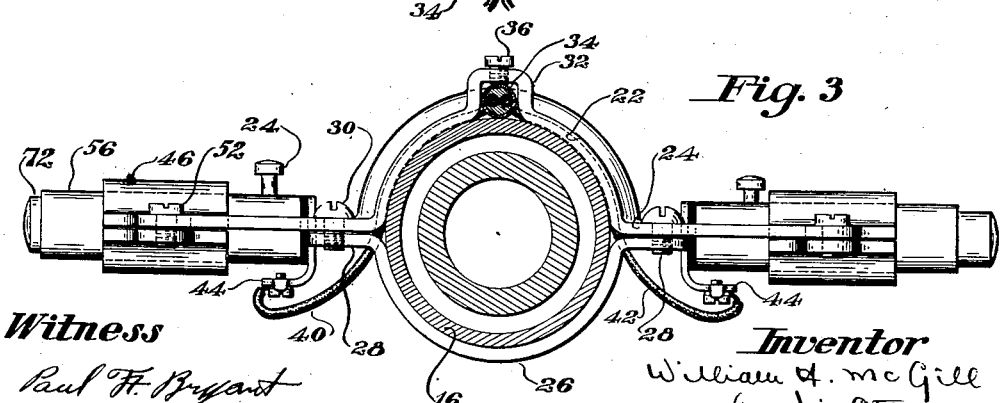
Witness
Paul F. Bryant
Inventor
William H. McGill Patented Sept. 8, 1936

2,053,776

UNITED STATES PATENT OFFICE 2,053,776

SIGNAL DEVICE

William H. McGill, Winchester, Mass.

Application July 14, 1931, Serial No. 550,655

8 Claims. (Cl. 200—59)

The present invention relates to semi-automatic switching devices, and more particularly to switching devices designed for operating direction and stop indicators or the like for motor vehicles.

The invention is particularly adapted for embodiment in a signal device such as described in my copending application Serial No. 518,420, filed February 26, 1931, and is intended for adaptation to the steering mechanism of existing vehicles without substantial modification thereof.

With the above and other objects in view, the various features of the invention consist in certain novel features of construction, combinations and arrangements of parts hereinafter described and claimed, the advantages of which will be obvious to those skilled in the art from the following description.

In the accompanying drawing illustrating the preferred form of the invention, Fig. 1 represents a partial view of a conventional steering wheel with a switch device attached thereto; Fig. 2 is a detail of the wheel shown in Fig. 1, illustrating the switching device on an enlarged scale; Fig. 3 is a section of the device taken on the line 3—3 of Fig. 2; and Figs. 4 and 5 are details illustrating the manually operated contact mechanism for closing the signal circuit.

As shown more particularly in the illustrated embodiment of the invention, a steering wheel 10 is provided with the usual spokes 12 and hub 14 at the end of a stationary or non-rotatable column 16. The switching mechanism is preferably clamped to the inclined column 16 immediately below the rotary hub of the wheel 14. To this end a supporting clamp made as a metallic stamping is indicated generally at 20. This clamp is provided with a semi-circular portion 22 to embrace the column, and with oppositely extending arms 24 to support the contact devices. Cooperating with the clamp member 20 is a complementary semi-circular band 26, having ears 28 which are connected to the clamp 20 by set screws 30, all as indicated in Figs. 2 and 3. The semi-circular portion 22 of the clamp 20 is provided with a projecting U-shaped portion 32, which embraces the cable 34 carrying the signal circuit, the cable being held in place by a set screw 36, and as shown particularly in Fig. 1, extending along the column therebeneath. At the upper end the cable is divided, and the two parts 40 and 42 extend respectively to contacts 44, one of which is indicated in Fig. 4. Each of the manually operable contact assemblies is indicated as slidably mounted in a sleeve 46 formed on the outer end of the arms 24 and closed to clamp assembly by set screws 52.

The contact comprises a cylindrical casing 56, closed at one end by a fibre insulating block 58, to which the stationary contact 44 is riveted at 60. Sliding through the block 58 is a movable contact 62, having a notch 64 which in the outer position is caused to engage with one side of the openings in the block 58 and contact 44, this engagement being caused by the leaf spring 66. In this outer locked position the face 68 of the movable contact makes contact with a face 70 on the fixed contact to close the signal circuit and indicate or otherwise operate the proper direction signal.

Actuation of the contact to closed position is accomplished by a head 72 attached to the opposite end of the member 62, and serving to move the contact into operative position against the resistance of a spring 74, which is supported by a partition 76 and which normally biases the contact to open position. In outer position, as indicated in Fig. 4, the contact becomes locked, maintaining the circuit closed until otherwise released. The opening of the circuit through release of contact is accomplished automatically by a projection 78 mounted in the hub 14, as indicated, and serving upon rotation of the wheel in one direction to engage and release the contact. This is accomplished by virtue of an inclined face 80, formed at the outer end of the movable contact 62. As the releasing projection 30 moves over the contact against the inclined face 80, the circuit remains closed, but when moved in the opposite direction, the movable contact is disengaged from the locking shoulder and retracted by the spring. The arrangement of the contacts at opposite sides of the column is such that after either a right or left turn signal has been manually actuated, turning of the wheel to make the indicated turn does not open the circuit, the projection sliding over the contact without disturbing the setting. After the turn has been completed, however, and the wheel is turned in a reverse direction to straighten out the vehicle, this movement in the opposite direction through engagement with the contact opens whichever circuit is closed and restores the contact devices to initial position.

As will be noted in Figs. 4 and 5, a manual reset is provided in the form of a finger projection 82 consisting of a stud passing through the leaf spring 66 and the contact rod 62 and a button member at its outer end which projects from the movable contact through the side of the casing 56 and enables the contact to be released manually if for any reason whatsoever this is desirable.

What is claimed is:

1. The combination with a rotary steering wheel and supporting column of a support detachably clamped to the column below the wheel, a manually operable contact device mounted upon the support out of engagement with the hub of the wheel, a sliding electrical contact in the contact device normally biased to open circuit position, means for latching the contact in circuit closing position, and a releasing projection mounted upon the hub of the wheel and designed to release by direct engagement the contact on turning movement of the wheel in one direction, the contact being provided with an inclined face to cause the projection to escape the contact without releasing it when the wheel is turned in the other direction.

2. The combination with a rotary steering wheel and supporting column of a clamping support having oppositely extending arms, a complementary clamp to embrace and engage the steering column, a contact device mounted at the outer end of each arm and disposed upon opposite sides of the steering wheel hub, an independently sliding contact normally biased to open circuit position and having inclined surfaces in each contact device, means for manually operating the contact, means for latching the contacts in circuit closing position, and a releasing projection mounted on the steering wheel and designed to engage directly with the sliding contact in circuit closing position to restore it to open circuit position when moved in one direction against it, but to engage the inclined surface thereof without restoring it to open circuit position when moved in the opposite direction.

3. A signal device comprising a rotary steering wheel, a stationary supporting column therefor, a clamping support on the column having angularly disposed arms, a similar tubular casing on each arm, a stationary contact outside the inner end of each casing, movable contacts sliding therethrough and insulated therefrom, means at the outer end of each casing for manually operating each movable contact into engagement with the respective stationary contact, means for locking the movable contact in engagement with the stationary contact outside the casing, and means on the steering wheel for causing the movable contact to be shifted to inoperative position when rotated into engagement therewith.

4. A signal device comprising a rotary steering wheel, a stationary supporting column therefor, a clamping support on the column having angularly disposed arms, a similar tubular casing on each arm, a stationary contact outside the inner end of the casing, movable contacts sliding therethrough and insulated therefrom, means at the outer end of each casing for manually operating each movable contact into engagement with the respective stationary contact, means for locking the movable contact in engagement with the stationary contact outside the casing, means on the steering wheel for causing the movable contact to be shifted to inoperative position when rotated into engagement therewith, and separate means for manually releasing the movable contact.

5. A signal device comprising a tubular casing having a slot in one end, a contact rod projecting at one end from the casing and sliding longitudinally in the casing, a spring within the casing acting to move the rod longitudinally in one direction, an operating button on the rod projecting from the other end of the casing, a stationary contact outside one end of the casing, means for locking the rod in engagement with the stationary contact against the action of the spring, and a member on the rod extending from the slot in the side of the casing for releasing the rod from the locking means.

6. A signal device comprising a tubular casing having an elongated slot in one side, a contact rod projecting at one end from the casing and sliding longitudinally in the casing, a spring within the casing acting to move the rod longitudinally in one direction, an operating button on the rod and projecting from the other end of the casing, a stationary contact, means for locking the rod in engagement with the stationary contact against the action of the spring, a projection extending through the slot in the side of the casing for limiting the movement of the rod, and a button member on the projection for releasing the rod from the locking means.

7. A signal device comprising a tubular casing, a contact rod projecting at one end from the casing and sliding longitudinally in the casing, a spring within the casing acting to move the rod longitudinally in one direction, an operating button on the rod and projecting from the other end of the casing, a stationary contact outside the first mentioned end of the casing, means for locking the rod in engagement with the stationary contact against the action of the spring by shifting the rod laterally of the casing, resilient means for shifting the rod when moved against the action of the spring to lock the rod in engagement with the stationary contact, and a member extending through the side of the casing for releasing the rod from the locking means when depressed against the action of the resilient means.

8. A signal device comprising a tubular casing, a contact rod projecting at one end from the casing and sliding longitudinally in the casing, a spring within the casing acting to move the rod longitudinally in one direction, an operating button on the rod and projecting from the other end of the casing, a stationary contact, means for locking the rod in engagement with the stationary contact against the action of the spring by shifting the rod laterally of the casing, a leaf spring secured to the rod and engaging the inner surface of the casing for shifting the rod when moved against the action of the spring to lock the rod in position and for providing electrical connection between the casing and the rod, a stud passing through one end of the leaf spring and the rod and extending through the side of the casing, and a releasing button on the outer end of the stud for shifting the rod from locking position when depressed.

WILLIAM H. McGILL.

CERTIFICATE OF CORRECTION.

Patent No. 2,053,776.  September 8, 1936.

WILLIAM H. McGILL.

It is hereby certified that error appears in the printed specification of the above numbered patent requiring correction as follows: Page 2, second column, line 4, claim 5, for the word "end" read side; and that the said Letters Patent should be read with this correction therein that the same may conform to the record of the case in the Patent Office.

Signed and sealed this 3rd day of November, A. D. 1936.

(Seal)  Henry Van Arsdale
Acting Commissioner of Patents.